March 19, 1957
R. G. REIP
2,785,659
STABILIZED HYDRAULIC RELAYS AND
HYDRAULIC RELAY STABILIZERS
Filed April 30, 1954
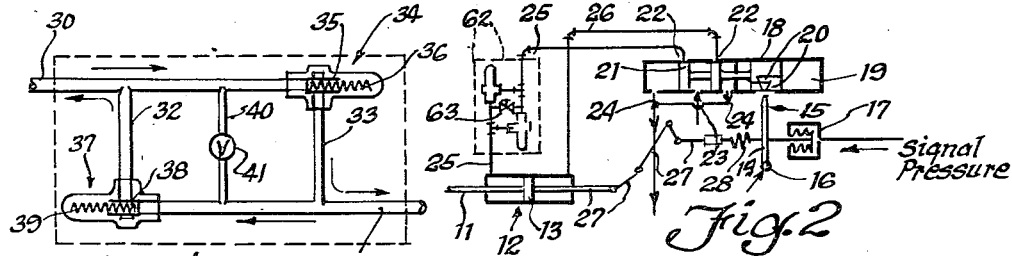
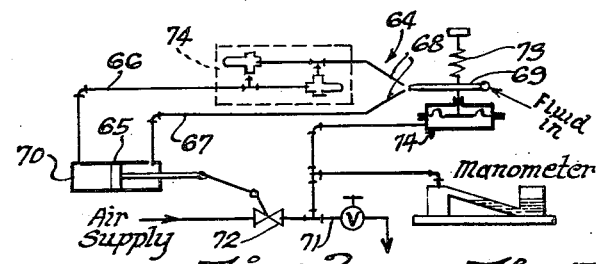
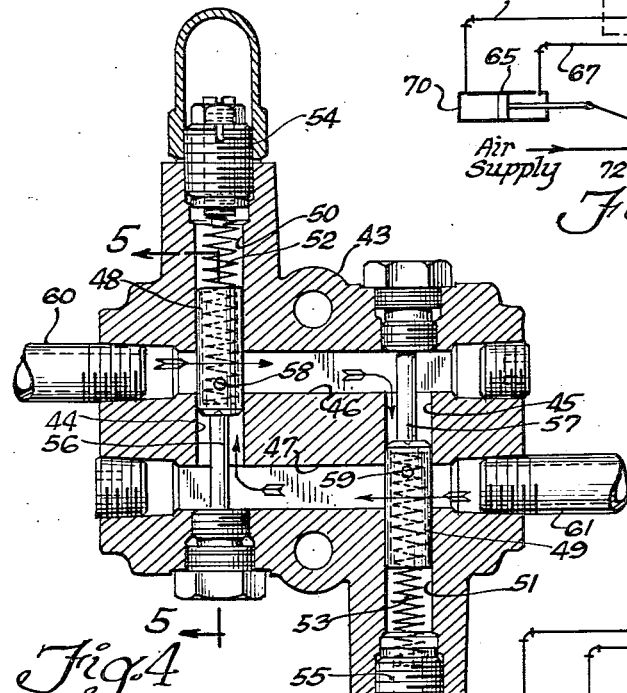
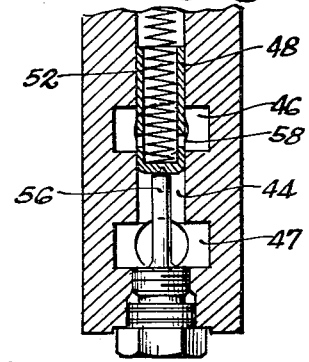
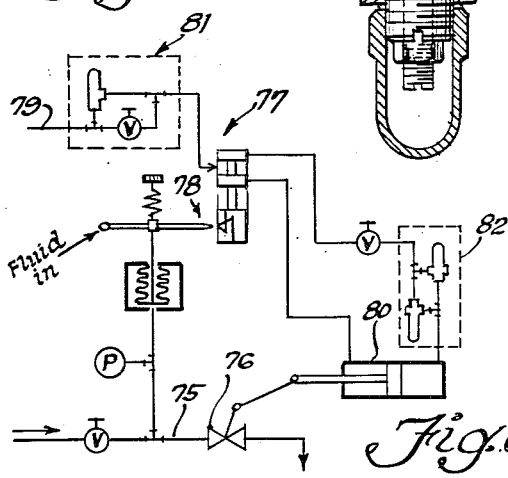
INVENTOR.
Raymond G. Reip
BY
Att'ys.

United States Patent Office 2,785,659
Patented Mar. 19, 1957

2,785,659

STABILIZED HYDRAULIC RELAYS AND HYDRAULIC RELAY STABILIZERS

Raymond G. Reip, Chicago, Ill., assignor to Askania Regulator Company, Chicago, Ill., a corporation of Illinois Application April 30, 1954, Serial No. 426,890

15 Claims. (Cl. 121—38)

The present invention relates to hydraulic relay apparatus, particularly for moving some movable element to a position and/or at a speed, corresponding to magnitude of an error between a speed or position called for by a primary control signal and the actual speed or position of the controlled element. More specifically the invention is directed to the problem of providing improved means of stabilizing such systems against overshoot and hunting, and at the same time to improving the speed response of such systems when adquately stabilized, as compared to systems stabilized by known means that seriously have impaired speed response.

The problem of such stabilization, as it is approached by the present invention, is closely related to volume rate of delivery of pressurized operating fluid to the power unit, and the present invention primarily is directed to provision of improved means for establishing a proportional relation between the volume rate of delivery of operating fluid to the power unit and the magnitude of the error. In accordance with the invention, this proportional relation is established by employment of throttling valve means that automatically vary the throttling effect that they exert on the flowing operating fluid in response to the volume rate of delivery of such fluid established by the regulator in accordance with the error magnitude. An arrangement of this kind presents a very substantial improvement over the generally employed practice of employing a needle valve in a flow line and adjusting it to stabilize operation in response ranges where instability occurs. While that practice does result in stabilizing the system, it seriously impairs the speed of the system, particularly in the ranges of higher speeds responsive to large errors. Normally instability of an unstabilized system occurs principally because of excessive fluid flow rates in ranges of response to small errors, and throttling stabilization by a fixed adjustment valve to eliminate such instability seriously impairs desirable high speed response to large errors.

A primary aspect of the invention relates to stabilization by throttling means that are self-adjusting to vary the throttling action inversely with the error magnitude as it is reflected by the flow rate resultingly selected by the regulator. Basically, this is accomplished by throttling valve means that open to permit flow of pressurized operating fluid upon development across them of pressure differential of preselected magnitude, and to an extent that is, at least to some extent, proportional to the magnitude of that differential, and the differential in turn being dependent upon the rate of fluid delivery by the relay regulator, and therefore upon the magnitude of the error.

Another aspect of the invention relates to combination of such self-adjusting throttling means with a highly specialized proportioning and stabilizing device of the kind disclosed and claimed by United States patent to Herbert Ziebolz, No. 2,312,464, dated March 2, 1943. This device comprises a self-resetting restoring cylinder and piston arrangement, the output element of which is coupled to the regulator controller to restore it to a position from which it has been moved, upon completion of a piston stroke of a length having a preselected proportional relation to magnitude of a signal change that has moved the regulator control element. Proportioning of the restoring piston stroke to system operation in response to the same signal and to degree of operation of the power unit of the system, is accomplished by connecting the two cylinder ends of the restoring assembly across a variable flow restricting orifice that is connected in one of the service lines from the controlled output ports of the regulator to the power unit, and the effective cross sectional area of which is varied by mechanical coupling to the regulator flow-selective element, thereby proportioning the variable orifice area, and the pressure drop across it at a given flow rate, to the control signal magnitude, exerting the same pressure drop across the restoring piston. The system is stabilized in proportional operation plus reset fashion, by so arranging the restoring assembly that the regulator control element is restored to its initial position prior to complete response of the system and of the power unit to the initiating signal magnitude, and a bypass around the restoring piston and spring biasing means for returning the latter to an intermediate, neutral position serve to eliminate the restoring effect of the assembly and permit an additional cycle of operation in response to the magnitude of signal then existing. The variable throttling device of the present invention satisfactorily replaces the mechanically variable orifice device disclosed by the patent, and alters the mode of operation of the system by rendering rate of operation of the restoring assembly responsive solely to the volume rate of fluid delivery by the regulator, as distinguished from response to the combination of a mechanical position and flow rate, as well as presenting certain economies in construction, installation and adjustment.

In the accompanying drawings:

Fig. 1 is a schematic disclosing the principle of arrangement of a throttling valve assembly arranged according to the invention.

Fig. 2 is a schematic illustration of one type of hydraulic positioning relay system embodying the invention.

Fig. 3 is a schematic illustration of another type of system embodying the invention.

Fig. 4 is a median longitudinal section of a specific form of valve assembly arranged in accordance with the invention.

Fig. 5 is a transverse section of the same assembly on the plane indicated by line 5—5 of Fig. 4.

Fig. 6 is a schematic illustration of a third type of system embodying the invention, and disclosing a more complex embodiment thereof.

Fig. 7 is a schematic illustration of a system embodying a somewhat different application of the invention.

In Fig. 2 is illustrated application of the invention to a typical hydraulic relay system that acts to position an output member, shown as the piston rod 11 of a piston and cylinder power unit assembly 12, by moving the piston 13 of that assembly to a position corresponding to the position of a movable control element, shown as the jet pipe 14 of a conventional jet pipe hydraulic relay regulator assembly 15. This is accomplished by operation of the system in response to each movement of control element 14 to move piston 13 through a stroke of a length having a preselected proportional relation to the degree of movement of the control element. In the specific arrangement shown, the jet pipe 14, which is pivoted to swing about a pivot axis 16 to change the angular direction of a stream of oil discharged from its tip, is subject to swinging movement by variations in a variable pressure control signal that is exerted in a bellows translator 17 to exert on the jet pipe a force of intensity that is proportional to its magnitude. The jet pipe is disposed to discharge the oil stream in the direction of a combined distributor and piston member 18 that is movable in a bore and that has a pair of receiver ports 20 narrowly spaced in the directions of travel of member 18 and of swinging of jet pipe 14. Ports 20 are cross connected through opposite ends of member 18. When jet pipe 14 swings it becomes more and less registered with the different receiver ports 20, and resulting unbalance of pressures at opposite ends of member 18 drive the latter, due to the cross connection of ports 20 and the piston ends in a direction to follow the jet pipe. When piston movement places ports 20 in equal registration with the jet pipe discharge orifice the pressures across piston 18 rebalance and movement of the piston terminates.

Piston and distributor member 18 has connected to it a conventional control valve body, as the spool body 21, which serves to select the identities of two output or controlled ports 22 that selectively and alternatively are placed in communication with a supply line 23 that delivers pressurized operating fluid, and with an exhaust system 24. To the controlled valve ports 22, which constitute the paired outputs of the regulator assembly, are connected a pair of service lines 25, 26 each of which has a first end connected with a different one of the ends of the cylinder of motor 12 and a second end connected with one of the regulator controlled ports 22 for conducting fluid to and from power unit 12 in a particular one of reversed senses selected by the relay regulator 15, 18, 21 and at a volume rate depending on the magnitude of pressure under which fluid is supplied by line 23, the open areas of the valve ports and the resistance of the load on piston 13.

In a system of the control valve type, as in Fig. 2, the system, formed by one of the cylinder ends, the service line 25 or 26 connected with it, the supply port and the controlled port 22 that is placed in communication with the latter is closed against escape of fluid between a source of fluid to which supply line 23 is connected and the pressurized cylinder end of power unit 13 that is placed in communication with supply line 23 by the control valve body 21. Also, between the exhausted cylinder end, that which is placed in communication with exhaust by valve 21, and the regulator valve, the system formed by the second cylinder end, the service line connected with it and the second controlled port 22 of the regulator, is closed. A characteristic of such a valve-controlled system is that upon opening of one controlled port, as 22, to supply and the other to exhaust, the full pressure at which operating fluid is delivered through supply line 23, appears across piston 13. When the latter starts to move a pressure drop occurs across the regulator valve, due to throttling effect of the valve ports and the magnitude of pressure across piston 13 depends upon a complex function of load resistance and piston speed, supply pressure of operating fluid, and effective passage cross section area defined by ports of the control valve which determines the throttling effect of the valve.

For proportioning distance of movement of the power unit output member 11 to degree of deflection of jet pipe 14 under a given variation in control signal magnitude, means are provided for exerting on the control member a restoring signal of a magnitude proportional to the volume of fluid flow occurring in response to the deflection. In Fig. 2 this proportional restoring signal is provided for by a mechanical drive train of links 27 and including a compression spring 28 for translating distance of movement of piston 13, which serves as a direct measure of volume of fluid flow, to a force of proportional magnitude. The train 27, 28 is connected to piston 13 and is arranged to exert its output force on jet pipe 14 in opposition to the control signal force, and operates to restore the jet pipe to a position from which it has been moved by a signal change, upon completion by the piston of a stroke of a length having the preselected proportional relation to the degree of that jet pipe deflection, which initiated system operation by movement of piston member 18 and valve body 21.

Such a system may be unstable and tend to overshoot and hunt, particularly due to lag of restoration effect by the train 27, 28 during small error operation, which occurs both when the initiating deflection of jet pipe 14 is small, or during the final period of system operation in response to a large error. Usual prior stabilization practice has been to throttle the flow through one of the lines 23, 25, 26 by a fixed adjustment valve, as a needle valve, so adjusted as to restrict the volume rate of operating fluid flow during operation in response to errors of magnitudes that result in such volume rate of fluid delivery as produce overshoot when the flow is not so throttled. While such systems can effectively and adequately be stabilized by this prior practice, it has resulted in very serious impairment of the maximum speed of operation of the system. Extreme cases have been encountered where such fixed throttling stabilization has reduced the maximum operating speed of the system by as much as 98%. The percentage of maximum possible speed of the unstabilized system that is permitted by fixed adjustment throttling stabilization is determined principally by the maximum speed at which the system will operate stably in response to an error of a magnitude productive of overshoot when the system is unstabilized. This is due to the fact that the fixed throttling valve will permit at large errors and resultant adjustment of the regulator for large flows, a flow rate very little greater than the one for which it is set to permit a maximum throttled flow under small error conditions, which throttled flow reduces the flow rate for which the regulator is set to eliminate instability at that magnitude of error. This limiting of system speed by a fixed adjustment throttle valve arises from the fact that the ratio of flow rate through the throttle valve to magnitude of pressure drop across it decreases very sharply with increase of the latter, and flow rate response levels off at pressure drops very little above the magnitude for which the valve is set to produce a stable operation-providing flow rate at a given, relatively small error magnitude.

In other words, the regulator loses control of the system for proportioning speed of operation to error magnitude at approximately the limit of proportional speed for which the stabilizing throttle valve is adjusted.

The primary concept of the invention is provision of a throttle valve that very severely throttles operating fluid flow at the magnitude of error that results in unstable operation with fluid flow unthrottled and its rate controlled by the regulator, but that opens automatically to reduce so far as is practical the throttling effect at error magnitudes calling for system operation at speeds, and therefore at fluid flow rates, above the speed and flow rate ranges that are productive of overshooting in the system when unstabilized and controlled solely by the regulator. The invention may be practised by placing in a flow line that is in closed communication with the power unit, and through which the regulator tends to vary the volume rate of delivery of operating fluid in proportional response to the magnitude of a controlling error signal, a throttling valve of a type resembling a check valve, and that is spring-biased to a throttling position that may be a closed position or one permitting a very limited volume flow rate, and that is arranged to resist flow in the direction of normal flow of fluid in that line, but that will open to permit such flow in response to a preselected magnitude of pressure differential across it in the direction or sense of that normal flow. The magnitude of differential pressure for which opening of the valve is set, is selected to correspond to a regulator adjustment for a fluid flow rate just above the highest rate productive of overshoot when the system is unstabilized. Fluid flow to provide operation at regulator adjustments productive of small differential pressures may be provided for by leakage of the valve, or by a bypass path around it. The most desirable arrangement for a reversible power unit system appears to be one wherein dual throttling valves are connected parallel and in reversed senses in one of the service lines between the regulator and power unit. In certain types of system, as will be disclosed in detail, a single throttling valve may be connected in the supply line to the regulator, and in systems of this kind presenting extreme stability problems good results have been accomplished by connecting throttling valve devices in both the supply line and in one of the service lines.

Fig. 1 shows schematically an operation-stabilizing arrangement of throttle valves suitable for connection in one of two service lines, as 25 or 26 of Fig. 2, connecting the controlled ports or outputs of a hydraulic regulator in closed communication with the two inputs of a reversible power unit. The arrangement includes a pair of main flow lines 30, 31 for coupling between two sections of the service line, and a pair of valve-controlled passage lines 32, 33 connected in parallel between lines 30, 31. A throttle valve 34 comprises a valve body 35 of piston type that is biased by a spring 36 to a position blocking or severely restricting flow of fluid from line 30 through passage 33 and to line 31, being biased in the direction counter to that flow and so arranged as to open to permit that flow when pressure of fluid in line 30 exceeds that in passage 33 sufficiently to overcome the closing force exerted by baising spring 36. The second throttle valve 37 includes a valve body 38, also of piston type, that is biased by a spring 39 to a position blocking or severely restricting flow of fluid from line 31 through passage 32 and to line 30 of bias being in the direction counter to that flow and so arranged as to open to permit that flow when pressure of fluid in line 31 exceeds that in passage 32 sufficiently to overcome the closing force exerted by biasing spring 39. It will be seen that, when the springs 36, 39 are set to provide a counter force to delivery of operating fluid at a volume flow rate for which the regulator as of Fig. 2, 15 is set, but which is productive of hunting or overshooting when the system is unstabilized, the actual volume rate of fluid delivery will be reduced. By selection of the biasing force exerted by springs 36, 39 instability resulting from too rapid fluid delivery can readily be eliminated. Additionally, it will be appreciated that, by proper selection of the characteristics of springs 36, 39 they can be arranged to yield to differential pressures generated across the closed valve bodies under system conditions responsive to errors in the range above those productive of unstable operation.

The arrangement of Fig. 1 is shown as provided with a bypass 40 connected between the flow lines 30, 31 and which may contain flow rate adjustment means, as throttle valve 41. Provision of a bypass, for the purpose of providing a range of flow rates below those productive of opening throttling valves 34, 37 and wherein the system will operate stably, has been found generally to be unnecessary.

Referring to the assembly unit shown in Figs. 4 and 5, which provides the same general arrangement as is shown in Fig. 1, but without a bypass such as 40, the unit comprises a body casting 43 containing all of the necessary lines, passages and valve housings and seats. The parallel, valve-controlled passages 44, 45 may be cylindrical and open into both of the flow line passageways 46, 47. The latter are of larger cross section than passages 44, 45 to provide for flow about the piston type valve bodies 48, 49, which, in their illustrated closed positions, extend across the flow lines 46, 47 with their end portions engaged in and substantially blocking passages 44, 45. The rear ends of the piston valve bodies 48, 49 are movable in counter bores 50, 51 containing biasing springs 52, 53, the bias force of which may be adjustable, as by threaded backing plugs 54, 55. Stop devices 56, 57 are provided to define the closed position of the valve bodies. Ports 58, 59 are provided in the valve bodies for bleeding the expansible chambers formed between the valve bodies and the walls of bores 50, 51.

With sections 60, 61 of one of two hydraulic service lines respectively connecting the outputs of a regulator with the inputs of a power unit controlled thereby, connected into the ends of flow line passages 46, 47, the unit will operate as described. In Fig. 2 such a unit, designated 62, but provided with a bypass 63 is shown connected in the service line 25.

Fig. 3 shows installation of an automatic variable throttling device, such as that of Figs. 1 and 2, connected in a different type of system, and with a different type of regulator. This regulator, designated generally 64 is of conventional jet pipe type, but without the booster arrangement 18, 21 of Fig. 2. Instead of driving an auxiliary piston, the jet pipe directly drives the power unit piston 65, the service lines 66, 67 being connected to the receiver ports relative to which the jet pipe 69 is swung to different ratios of degrees of registration with the different receiver ports and which are respectively productive of different volume rates of fluid delivery to the different ports, and of different pressure differentials between them and exerted across the piston.

In a system of this kind both of the delivery lines are continuously in communication with exhaust, fluid displaced from the one that is at lower pressure simply flowing from the connected receiver port 68. Thus the system is closed against escape of fluid only between the power unit cylinder 70 and the receiver ports 68. The system is markedly different in operation from a system controlled by a valve, such as 21 of Fig. 2, because, regardless of load resistance and piston speed, the maximum pressure differential across piston 65 is determined solely by the angular position of jet pipe 69, and the ratio of the degrees of registration with the different receiver ports 68. In other words, in this arrangement there is no throttling effect that varies with the area of passage provided by a valve body.

The system of Fig. 3 is shown as controlling fluid pressure in a conduit 71 by adjustment of a valve 72. The pressure in conduit 71 is applied to jet pipe 69 against force of a return spring 73, by an expansible chamber motor 74. Proportioning of operating fluid volume flow in response to a movement of jet pipe 69 is accomplished by restoration of the jet pipe to its neutral position of equal registration with ports 68 through return of pressure in conduit 71 to its proper magnitude.

Such a system may tend to unstable operation, due to lag of an error and deflection of the jet pipe by the responsive change in the controlled pressure. An automatic throttling valve arrangement of the type disclosed by Figs. 1, 4 and 5 is shown as connected in the service line 66.

Fig. 6 discloses a system quite similar to that of Fig. 3, in that it is arranged to control pressure of a fluid in a conduit 75 by adjustment of a valve 76, but wherein the regulator 77 includes, as in Fig. 1, a booster that is driven by a jet pipe device 78 to increase the gain of the regulator, that is, the ratio of fluid delivery volume flow rate to a signal magnitude. Since, in a valve-controlled relay the system is closed against fluid escape between the supply line 79 and the side of the power unit cylinder 80 that is connected by the booster 77 to the supply line, an automatic throttling valve connected in the supply line, as at 81, is effective to throttle the volume rate of fluid delivery to either end of the cylinder 81, and in certain instances a single such throttle valve, biased against flow to the regulator and adjusted to perform that throttling at error magnitudes productive of system instability, and to open at slightly larger errors, has been proven to be satisfactory. In most instances, however, and apparently due to frequency of operation of the throttling valve accompanying each reversal of piston drive, a dual direction assembly connected in one of the service lines proves superior. It is to be noted however, that in the case of very unstable systems a combination of automatic throttling valves, with one unidirectional one connected as at 81 in the supply line, and with a dual directional self-adjusting throttling valve system, as that of Figs. 1 or 4, connected in one of the service lines, as at 82 in Fig. 6, has solved the problem, providing adequate stability and increasing the maximum speed of the system from approximately 2% to 50% of the maximum fluid delivery rate of which the relay is capable.

Fig. 7 discloses a quite different application of the invention, wherein it is utilized as a variable throttling device that selects the rate of operation of the self-resetting control-restoring device of the kind disclosed in the above-identified Ziebolz patent. In this system the restoration of a relay regulator control element, shown as a jet pipe 85 is the piston 86 of a so-called "stabilizer" assembly 87. This assembly includes a cylinder 88 having between its ends a bypass 89. This system, as the others described, operates by restoration of the regulator control element 85 to a position from which it has been deflected by a signal change, upon delivery to the power unit of a volume of operating fluid having the preselected proportional relation to the degree of that deflection. In the system of Fig. 7, in order to avoid connection of cylinder 87 in series in one of the service lines to establish this proportional relation, it is connected across a flow restriction, volume flow rate through which determines the pressure drop that is developed across it, that is effective across piston 86 and that determines rate of travel of the latter and therefore the rate of restoration of control element 85. Obviously this differential pressure must be a measure of the flow rate called for by the error signal and for which the regulator is adjusted. In the patent this pressure differential is adjusted by a variable opening adjustable orifice device connected in one of the controlled lines and operated by movement of a valve body, such as 21 of Fig. 2. In the present Fig. 7, however, instead of such a mechanically operated device, a self-adjusting throttling valve assembly 90 is connected in a controlled line 91. By proper selection of the characteristics of the biasing springs in a valve assembly such as that of Figs. 1 or 4, the ratio of differential pressure effective across piston 86 to the flow rate imposed by the regulator may be selected.

The use of the automatic throttling valve instead of a variable orifice device that is adjusted by a mechanical movement of a driving part permits employment of the proportioning device 87 with a simple jet pipe regulator of the arrangement shown, without necessity of an auxiliary driving piston, as 18 of Fig. 2, which heretofore has been required for use of this proportioning device with a jet pipe regulator. Additionally it eliminates the very exact centering operation between the variable orifice device and the booster control valve that has been required in a system arranged as shown in the patent. The latter is of great practical importance, especially in cases where an offset relation between the control valve and the orifice device is required, as, for example, where the relay has to resist a load that is exerted in one direction, which is a situation wherein the control valve must be slightly displaced from its neutral position while the system is in a no-error condition.

The by-pass 89 is to provide for a gradual elimination of the restoring effect of piston 86 upon control member 85 after the regulator has terminated delivery of flow by restoration of member 85. Piston 86 is biased to a neutral intermediate position, to which bypass 89 permits it to travel after disappearance of pressure differential across the throttling assembly 90 and piston 86.

Relative to operation of automatically opening throttling valves in ranges wherein the valves remain closed, and the desirability of making bypass provision for fluid flow in these ranges, it has been found that piston valves of the kind illustrated in Fig. 4 operate extremely well without bypassing, and in ranges of low error, low volume rates of fluid delivery, and slow power unit response, and wherein the valves remain closed. Apparently under the differential pressures that are developed across them in such ranges, and lower than those at which the valves are set to open, there is leakage past the valves that permits power unit operation in the ranges requiring stabilization.

The many advantages, principles and concepts of the herein disclosed invention will be apparent from the foregoing. It will be readily apparent that many changes and alterations of the detailed and exemplary specifically illustrated and described embodiments may be resorted to within the scope of the invention, which is to be interpreted solely by the appended claims.

I claim:

1. The combination with a hydraulic relay system for operating a hydraulic power unit by delivery to it of pressurized operating fluid, said system comprising a supply line for coupling to a source of pressurized operating fluid, a regulator provided with an inlet port, a controlled port and means movable to regulate fluid delivery from said inlet to said controlled port in accordance with the magnitude of a control signal, a service line having a first end for coupling to a power unit to be operated, and said system being closed against escape of fluid at least between said first end of said service line end and said regulator controlled port; of throttling valve means connected in one of said lines at a location between which and said first end of the service line said system is so closed, said valve means being movable from a closed position throttling flow in a normal direction through that line to an open position permitting such flow, and means biasing said throttling valve means to its said closed position and permitting it to open under a preselected magnitude of pressure differential across it in said direction of flow.

2. The combination of claim 1, including passage-providing means connected in by-passing relation to said throttling valve means and providing passage for flow therethrough at a preselected volume rate lower than that necessary to generate pressure differential across said throttling valve means sufficient to open the latter.

3. The combination of claim 1, wherein said throttling valve means is connected in said service line.

4. The combination of claim 1, wherein said throttling valve means is connected in said service line, and said regulator is arranged to proportion, according to its adjustment, delivery to said service line and to an exhaust, fluid delivered to its input by said supply line.

5. The combination of claim 1, wherein said throttling valve means is connected in said service line and said regulator comprises a receiver provided with said controlled port having a port connected to said service line, and a jet pipe connected to said input, arranged to deliver a jet of operating fluid toward said port, and pivotally mounted to swing to greater and less registration with said port.

6. The combination of claim 1, wherein said throttling valve means is connected in said supply line.

7. The combination of claim 1, wherein said throttling valve means is connected in said supply line and said regulator comprises a valve chamber connected with its said input and output and valve body means movable in said chamber to vary the effective cross sectional area of a communication path between said input and output.

8. The combination of claim 1, wherein said throttling valve means comprises a first throttling valve connected in said supply line and has a valve body arranged to open in the direction of fluid flow therethrough to said regulator, and spring means biasing said valve body to its closed position and permitting it to open under a preselected magnitude of pressure differential in said direction of flow, and a second throttling valve connected in said service line and including a second valve body movable from a closed position in a direction corresponding to flow through the latter line in a normal direction, and spring means biasing said second valve body to its closed position and permitting it to open under a preselected magnitude of pressure differential across it in said direction of normal flow.

9. The combination of claim 1, wherein said system includes a pair of service lines having ends for respective connection to the different ones of two inputs of a reversible power unit, said regulator has a pair of controlled ports respectively connected with the different said service lines and a valve body movable adjustably in a valve chamber to select identity of one of said service lines through which fluid supplied by said supply line is delivered and the rate of flow of fluid so delivered, and to permit exhaust flow of fluid through the other controlled line, and wherein said throttling valve is connected in said supply line and has a body arranged to open in the direction of fluid flow therethrough to the regulator, said spring means biases said valve body to its closed position and permits it to open under a preselected magnitude of pressure differential in said direction of flow, and including a pair of throttling valves connected in a single one of said service lines and respectively having a second and a third valve body and the latter said bodies being arranged to move from closed positions to permit flow in opposite directions through that service line, and spring means biasing each of said second and third valve bodies to their closed positions and permitting them to open under pressure differentials of preselected magnitudes exerted across them in senses of opposite directions of flow.

10. The combination of claim 1, wherein said system comprises a pair of service lines respectively for coupling to the different inputs of a power unit that is operable by delivering pressurized operating fluid to one and permitting fluid to exhaust from the other of the different ones of its two inputs and that is reversible by reversing the sense of such delivery and exhaust, and said regulator is adjustable selectively to deliver fluid from said supply line through one and permit exhaust of fluid through the other of said service lines in either sense.

11. The combination of claim 1, wherein said system comprises a pair of service lines respectively for coupling to the different inputs of a power unit that is operable by delivering pressurized operating fluid to one and permitting fluid to exhaust from the other of the different ones of its two inputs and that is reversible by reversing the sense of such delivery and exhaust, said regulator is adjustable selectively to deliver fluid from said supply line through one and permit exhaust through the other of said service lines in either sense, and said throttling valve means is connected in a single one of said service lines and comprises a pair of valve bodies each movable from a position substantially blocking fluid flow through that line to an open position and arranged to be moved to open positions respectively by fluid flowing in opposite directions through that single service line, and spring means individually biasing the different said valve bodies to their closed positions and permitting them to open respectively in response to preselected magnitudes of pressure differential across them of opposite senses.

12. The combination with hydraulic servomotor relay apparatus for positioning an output element in correspondence to magnitude of a variable control signal, which apparatus comprises a hydraulic system including a supply line for coupling to a source of pressurized operating fluid, a power unit operable to move said element by delivery of pressurized operating fluid and permitting exhaust escape of fluid to and from the different ones of two fluid inputs thereof and reversible by reversing the sense of such delivery and exhaust and a regulator having an input inlet coupled to said supply line, a pair of controlled ports and a control member movable to different positions to select identity of one of its said controlled ports through which is delivered fluid supplied through said supply line and rate of such delivery and to permit exhaust of fluid through the other of its said controlled ports, a pair of service lines respectively connecting the different said controlled ports to corresponding ones of said power unit inputs, and said system being closed against escape of fluid at least between said regulator controlled ports and power unit inputs, and means responsive to volume flow through one of said lines to move said regulator control member toward a position from which it has been moved by a control signal variation as the volume of resulting flow approaches a selected proportional relation to distance of such control element movement; of throttling valve means connected in one of said lines in a location between which and said power unit inputs said system is closed against escape of fluid, and comprising a valve body movable from a closed position substantially blocking flow of fluid therethrough in a normal direction and to an open condition wherein it is movable through a range of positions wherein respectively it throttles such flow in various degrees, and spring means biasing said valve body to said closed position and permitting it to open to flow in said normal direction under a preselected magnitude of pressure differential across it in the sense of fluid flow in that direction.

13. The combination of claim 12, wherein said throttling valve means is connected in one of said service lines, and comprises a pair of said valve bodies, each movable in opposite senses from closed positions, respectively to permit flow in opposite directions through that service line, and spring means biasing each of said valves to its closed position, and permitting it to open under pressure differential across it in the sense of flow in the direction of flow that it permits when open and of a preselected magnitude.

14. The combination of claim 12, wherein said throttling valve means comprises a first throttling valve connected in said supply line to open in the direction to permit flow to said regulator, and second and third throttling valves connected in the same one of said service lines, and arranged to permit flow in opposite directions through that service line, and each of said throttling valves having independent spring means biasing its body as described.

15. A hydraulic positioning system for moving the output element of a reversible hydraulic power unit to a position corresponding to the magnitude of a control signal and having a pair of inputs to which and from which supply of pressurized operating and fluid exhaust in opposite senses respectively produce reverse operation; said system comprising a regulator having an input for coupling to a source of pressurized operating fluid, a pair of controlled ports, a movable control element, and means adjustable by movement of the latter to select identity of and rate of flow through one of said controlled ports of fluid delivered to its said input and to permit exhaust fluid flow through its other said output, a pair of service lines connected to said outputs for respective coupling to the different inputs of a power unit, a restoring piston and cylinder assembly of which the opposite cylinder ends are connected to a single one of said service lines at locations spaced therealong, spring means biasing the piston of said assembly to an intermediate position and structure providing a restricted bypass flow path between said cylinder ends, throttling valve means connected in said single one of said service lines between said locations and, said throttling valve means being biased to closed condition and, in response to pressure differentials across it of opposite senses and of preselected magnitudes, being operable to permit flows in opposite directions between said locations and through said single service line, and means connecting said piston with said relay controlled element to restore the latter to a position from which it has been moved upon completion by said piston of a stroke of a length having a preselected proportional relation to the distance of movement of said control element.

References Cited in the file of this patent

UNITED STATES PATENTS

| | | |
|---|---|---|
| 700,162 | Wiley | May 13, 1902 |
| 2,244,894 | Parker | June 10, 1941 |
| 2,312,464 | Ziebolz | Mar. 2, 1943 |
| 2,501,305 | Bennett | Mar. 21, 1950 |
| 2,570,937 | Gash | Oct. 9, 1951 |
| 2,682,748 | Ernst | July 6, 1954 |